US 6,714,270 B2

(12) United States Patent
Seiki et al.

(10) Patent No.: US 6,714,270 B2
(45) Date of Patent: Mar. 30, 2004

(54) TRANSFLECTIVE LIQUID CRYSTAL DISPLAY

(75) Inventors: Masahiro Seiki, Fukaya (JP); Ryoichi Watanabe, Yokohama (JP); Akimasa Toyama, Himeji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 61 days.

(21) Appl. No.: 10/043,193

(22) Filed: Jan. 14, 2002

(65) Prior Publication Data

US 2002/0126240 A1 Sep. 12, 2002

(30) Foreign Application Priority Data

Jan. 15, 2001 (JP) ........................................ 2001-006063

(51) Int. Cl.⁷ ...................... G02F 1/1335; G02F 1/1343
(52) U.S. Cl. ........................ 349/114; 349/113; 349/139
(58) Field of Search ................................. 349/113, 114, 349/139

(56) References Cited

U.S. PATENT DOCUMENTS

| | | | | | |
|---|---|---|---|---|---|
| 6,452,654 | B2 | * | 9/2002 | Kubo et al. .................. | 349/114 |
| 2001/0004276 | A1 | * | 6/2001 | Urabe et al. ................. | 349/106 |
| 2001/0024257 | A1 | * | 9/2001 | Kubo et al. .................. | 349/138 |
| 2002/0027627 | A1 | * | 3/2002 | Yamada et al. .............. | 349/113 |
| 2002/0036732 | A1 | * | 3/2002 | Kim ............................ | 349/113 |
| 2002/0109811 | A1 | * | 8/2002 | Park et al. ................... | 349/113 |
| 2002/0171792 | A1 | * | 11/2002 | Kubota et al. ............... | 349/114 |

FOREIGN PATENT DOCUMENTS

JP            11-316382           11/1999

* cited by examiner

*Primary Examiner*—Tarifur R. Chowdhury
(74) *Attorney, Agent, or Firm*—Oblon, Spivak, McClelland, Maier & Neustadt, P.C.

(57) ABSTRACT

There is provided a liquid crystal display wherein a first display region corresponding to a first area on which first pixel electrodes are provided displays an image by light reflection mode, and a second display region corresponding to a second area on which second pixel electrodes are provided can display an image by light transmission mode.

24 Claims, 6 Drawing Sheets

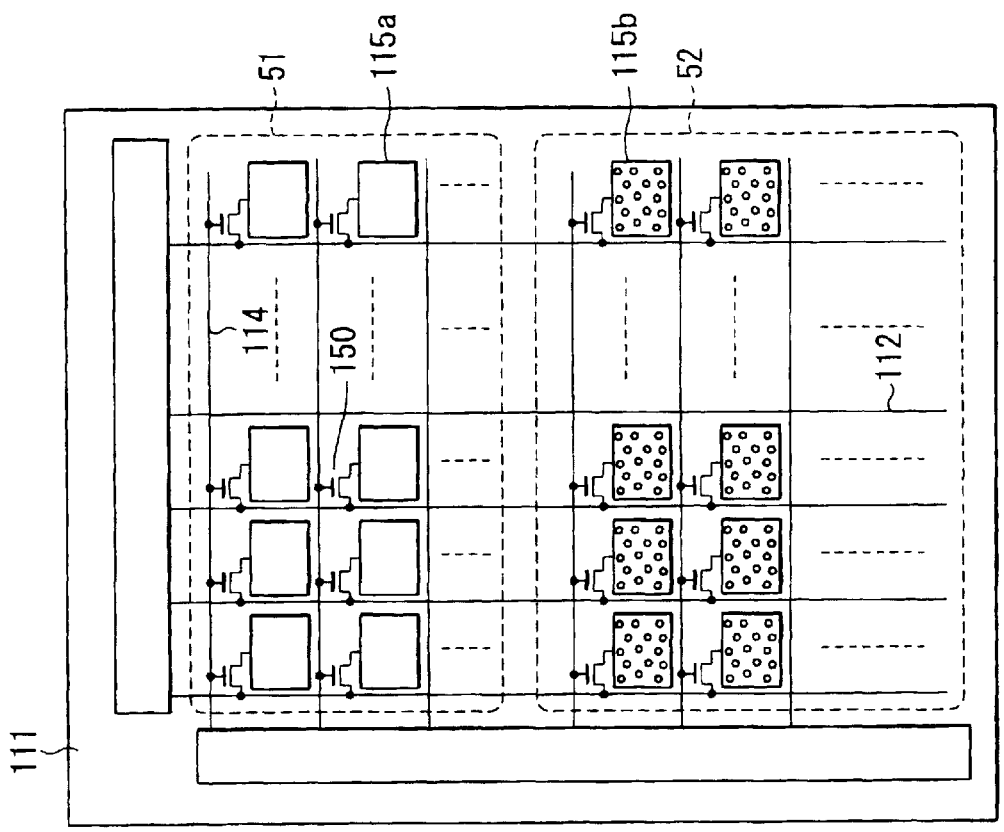
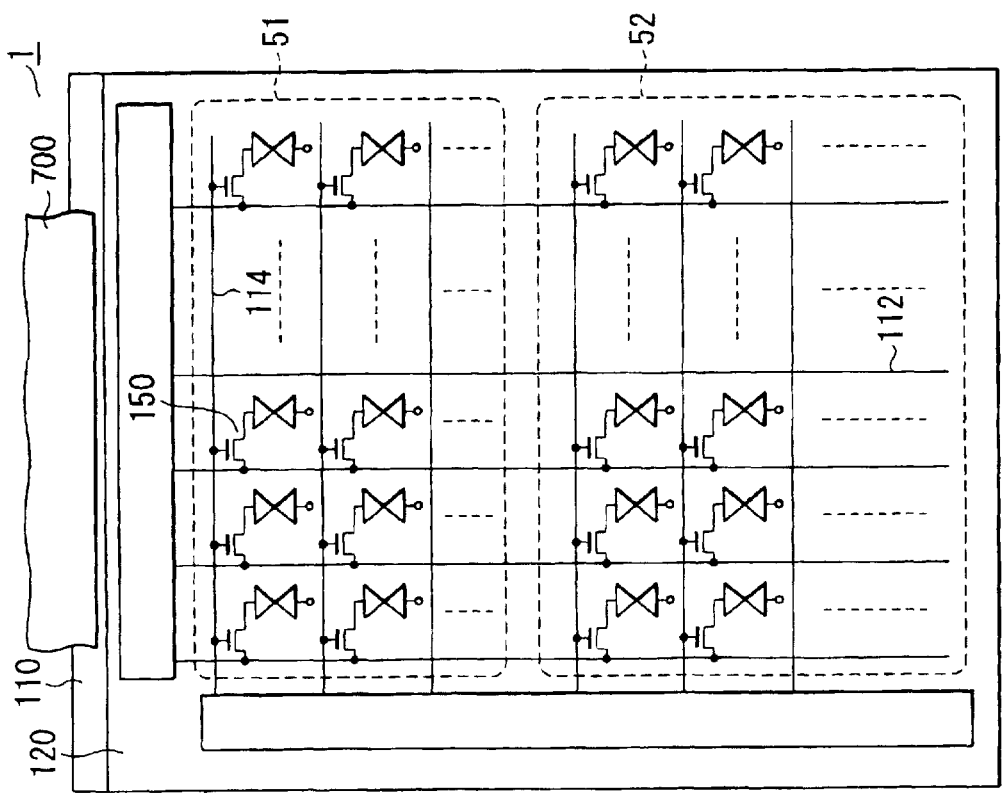
FIG. 2A
FIG. 2B

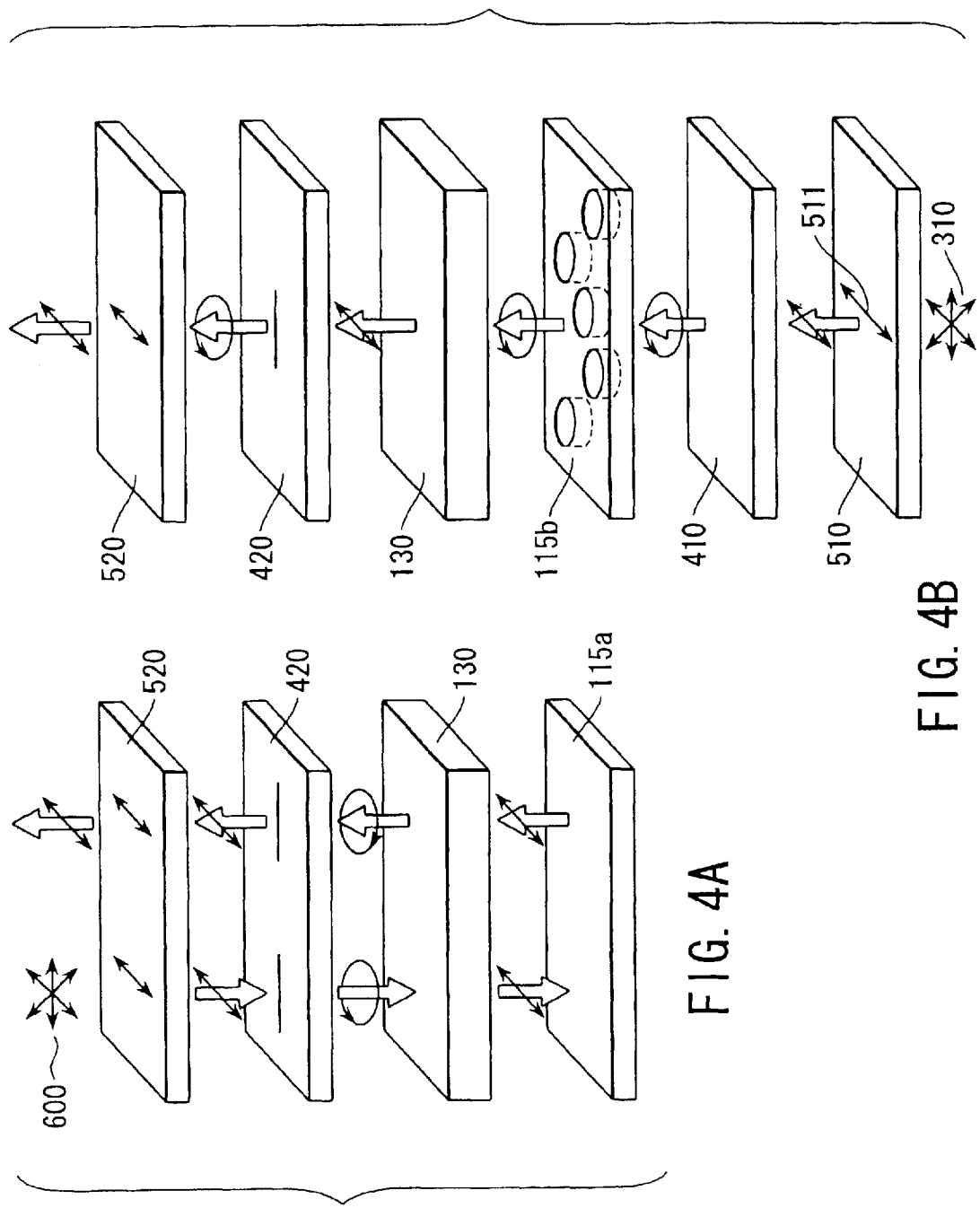

TRANSFLECTIVE LIQUID CRYSTAL DISPLAY

CROSS-REFERENCE TO RELATED APPLICATIONS

This application is based upon and claims the benefit of priority from the prior Japanese Patent Application No. 2001-006063, filed Jan. 15, 2001, the entire contents of which are incorporated herein by reference.

BACKGROUND OF THE INVENTION

1. Field of the Invention

The present invention relates to a liquid crystal display capable of displaying an image by a light reflection mode and a light transmission mode.

2. Description of the Related Art

It was sufficient for the conventional display of portable equipment such as a portable telephone or a pager to be capable of displaying simple characters such as numerals and letters. However, in accordance with the drastic development in the IT technologies achieved in recent years, it is desirable for a small, light and thin display having a low power consumption and capable of displaying a high quality color image to be put to a practical use even in the field of portable equipment, particularly, a portable information terminal.

As a display meeting the requirement noted above, a reflection type liquid crystal display, for example, is considered hopeful and has already been put partly to a practical use. When used outdoors in the daytime, the reflection type liquid crystal display is capable of displaying an image that is visible easily. However, a light source is not included in the reflection type liquid crystal display, with the result that the image displayed in a dark place can be scarcely recognized. In other words, the reflection type liquid crystal display is limited by the environment of use.

As a countermeasure, proposed is a front light technology. In the front light technology, the display surface of the reflection type liquid crystal display is covered with a transparent planar light source so as to make up for the insufficient illuminance of the external light. In this technology, it is unnecessary to change the internal structure of the liquid crystal display. However, the quality of the image is lowered by the reduction in the amount of reflected light, the blurring of the image, the increase in the feeling of thickness (or depth), etc.

Jpn. Pat. Appln. KOKAI Publication No. 11-316382 discloses a liquid crystal display capable of displaying an image by utilizing both the light reflection and the light transmission modes. In the liquid crystal display, each of the pixel electrodes is formed by the combination of a light reflecting conductive film and a light transmitting conductive film. According to the liquid crystal display of the particular construction, an image is displayed by light reflection mode under an environment of high illuminance, and a backlight is lit under an environment of low illuminance to display an image by both light reflection mode and light transmission mode.

The liquid crystal display referred to above, which utilizes the light reflection mode and the light transmission mode in combination, permits displaying an image that can be recognized satisfactorily without depending on the illuminance of the external light. However, the light reflecting conductive film and the light transmitting conductive film, which are included in the particular liquid crystal display, are formed by independent processes so as to lower the yield and to increase the manufacturing cost of the liquid crystal display. In addition, it is necessary to superpose the light reflecting conductive film and the light transmitting conductive film one upon the other in the liquid crystal display of the particular construction, with the result that a marked reduction in reflectance is derived from the overlapping of these conductive films so as to make it difficult to obtain a bright image. Further, in the liquid crystal display utilizing the light reflection mode and the light transmission mode in combination, while certainly low in its power consumption compared with the liquid crystal display of the light transmission mode, the power consumption is not necessarily lowered sufficiently.

BRIEF SUMMARY OF THE INVENTION

An object of the present invention is to provide a liquid crystal display capable of displaying a highly visible image without depending on the environment of use and also capable of further suppressing the power consumption.

According to a first aspect of the present invention, there is provided a liquid crystal display, comprising first and second substrates facing each other, first pixel electrodes arrayed on a first area within a surface of the first substrate facing the second substrate, second pixel electrodes arrayed on a second area within the surface of the first substrate facing the second substrate, the second area being different from the first area, a first common electrode supported by the second substrate and facing first pixel electrodes, a second common electrode supported by the second substrate and facing the second pixel electrodes, and a liquid crystal layer interposed between the first pixel electrodes and the first common electrode and between the second pixel electrodes and the second common electrode, wherein a first display region corresponding to the first area displays an image by light reflection mode, and a second display region corresponding to the second area can display an image by light transmission mode.

According to a second aspect of the present invention, there is provided a liquid crystal display, comprising first and second substrates facing each other, first pixel electrodes arrayed on a first area within a surface of the first substrate facing the second substrate, second pixel electrodes arrayed on a second area within the surface of the first substrate facing the second substrate, the second area being different from the first area, a first common electrode supported by the second substrate and facing the first pixel electrodes, a second common electrode supported by the second substrate and facing the second pixel electrodes, and a liquid crystal layer interposed between the first pixel electrodes and the first common electrode and between the second pixel electrodes and the second common electrode, wherein each of the first pixel electrodes is formed of a reflecting conductive film, and each of the second pixel electrodes is formed of a reflecting conductive film provided with at least one opening.

According to a third aspect of the present invention, there is provided a liquid crystal display, comprising first and second substrates facing each other, first pixel electrodes arrayed on a first area within a surface of the first substrate facing the second substrate, a reflecting film interposed between the first pixel electrodes and the first substrate, second pixel electrodes arrayed on a second area within the surface of the first substrate facing the second substrate, the second area being different from the first area, a first common electrode supported by the second substrate and facing the first pixel electrodes, a second common electrode supported by the second substrate and facing the second pixel electrodes, and a liquid crystal layer interposed between the first pixel electrodes and the first common electrode and between the second pixel electrodes and the second common electrode, wherein each of the first pixel electrodes and the second pixel electrodes is formed of a transparent conductive film.

Incidentally, the light reflection mode denotes a display mode utilizing external light incident on the side of the display surface or light emitted from a front light without utilizing the light source arranged on the side of the non-display surface. On the other hand, the light transmission mode denotes a display mode, which is low in the utilization rate of external light or light emitted from the front light compared with the light reflection mode and which utilizes light emitted from a light source arranged on the side of the non-display surface. In other words, the light transmission mode includes both the mode for performing the display by utilizing the light source alone arranged on the side of the non-display surface and the mode (light reflection-transmission combination mode) for performing the display by utilizing both light emitted from the light source arranged on the side of the non-display surface and light on the side of the display surface source (external light and/or front light).

In the liquid crystal display according to each of the first and third aspects of the present invention, an image can be displayed by the light reflection mode in the first display region corresponding to the first area, and an image can be displayed by the light transmission mode in the second display region corresponding to the second area.

In the liquid crystal display according to each of the first and second aspects of the present invention, an image can be displayed by the light reflection mode in the first display region corresponding to the first area, and an image can be displayed by both the light reflection mode and the light transmission mode in the second display region corresponding to the second area.

In the liquid crystal display according to the first aspect of the present invention, it is possible for each of the first pixel electrodes to be formed of a conductive film capable of reflecting the light, and it is possible for each of the second pixel electrodes to be formed of a conductive film capable of reflecting the light and provided with at least one opening. In this case, it is possible for a material of the first pixel electrodes to be the same as a material of the second pixel electrodes. Further, it is possible for a material of the first common electrode to be the same as a material of the second common electrode.

In the liquid crystal display according to the first aspect of the present invention, it is possible for each of the first pixel electrodes and the second pixel electrodes to be formed of a transparent conductive film. In this case, it is possible for the liquid crystal display to further comprise a reflecting layer interposed between each of the first pixel electrodes and the first substrate.

In the liquid crystal display according to each of the first to third aspects of the present invention, it is possible for the first common electrode and the second common electrode to be electrically connected to each other.

Further, it is possible for the liquid crystal display according to each of the first to third aspects of the present invention to further comprise a planar light source device configured to emit light from a side of the first substrate opposite to a side of the first substrate facing the second substrate toward the liquid crystal layer. In this case, it is desirable for the planar light source device to be configured to irradiate selectively the second display region among the first and second display regions with the light.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2A is a plan view showing the liquid crystal display shown in FIG. 1A;

FIG. 2B is a plan view schematically showing the array substrate included in the liquid crystal display shown in FIG. 1A;

FIGS. 4A and 4B are oblique views each showing schematically the state of the bright display;

DETAILED DESCRIPTION OF THE INVENTION

Figure 1A:
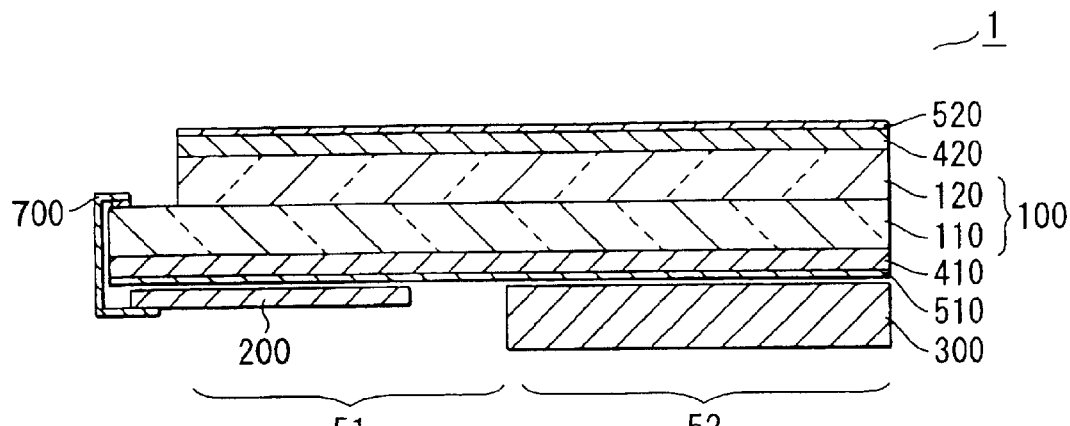
FIG. 1A is a cross-sectional view schematically showing the construction of a liquid crystal display according to a first embodiment of the present invention.

Some embodiments of the present invention will now be described in detail with reference to the accompanying drawings. In the accompanying drawings, the same constituting elements are denoted by the same reference numerals so as to avoid an overlapping description.

Figure 1B:
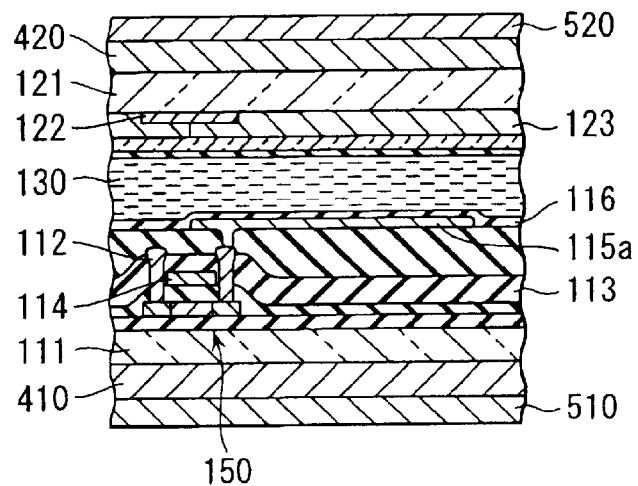
FIGS. 1B and 1C are cross-sectional views each showing in a magnified fashion a part of the liquid crystal display shown in FIG. 1A.
Figure 1C:
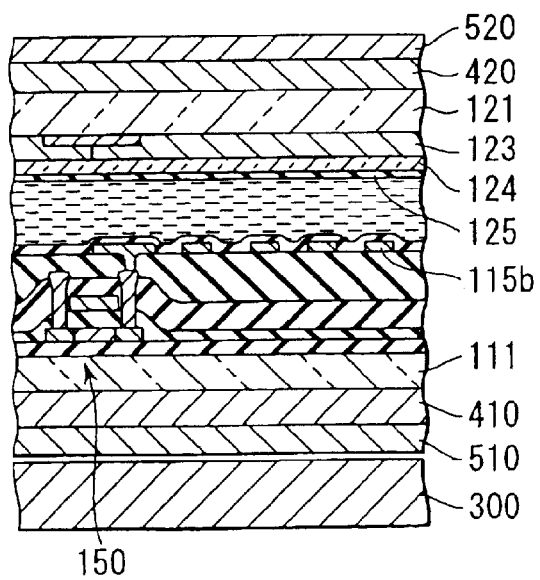

FIG. 1A is a cross-sectional view schematically showing the construction of a liquid crystal display 1 according to a first embodiment of the present invention, and FIGS. 1B and 1C are cross-sectional views each showing in a magnified fashion a part of the liquid crystal display 1 shown in FIG.

1A. Also, FIG. 2A is a plan view showing the liquid crystal display 1 shown in FIG. 1A, and FIG. 2B is a plan view schematically showing the array substrate included in the liquid crystal display 1 shown in FIG. 1A.

The liquid crystal display 1 according to the first embodiment of the present invention is, for example, a VGA type liquid crystal display having a diagonal dimension of 10 cm. In the liquid crystal display 1, the display region comprises a reflecting region 51 in which an image is displayed by the light reflection mode and a reflecting-transmitting region 52 in which an image is displayed by the combination of the light reflection and the light transmission modes. The structure shown in FIG. 1B corresponds to a part of the reflecting region 51 included in the liquid crystal display 1 shown in FIG. 1A, and the structure shown in FIG. 1C corresponds to a part of the reflecting-transmitting region 52 included in the liquid crystal display 1 shown in FIG. 1A.

The liquid crystal display 1 comprises mainly a liquid crystal cell 100 and a planar light source device 300 arranged in a position corresponding to the reflecting-transmitting region 52 of the liquid crystal cell 100 so as to irradiate the region 52 with light emitted from the planar light source device 300. The liquid crystal cell 100 includes an array substrate 110, a counter substrate 120, and a liquid crystal layer 130 arranged between these substrates 110 and 120 with an alignment layer interposed therebetween, and light is emitted from that surface of the liquid crystal cell 100 which is opposite to the surface of the cell 100 facing the planar light source device 300. The liquid crystal cell 100 is connected to a control circuit board 200 via a TCP (tape carrier package) 700 having a driving IC mounted on a flexible wiring board. The TCP 700 is foldable. In this embodiment, the control circuit board 200 is arranged on the side opposite to the light-emitting surface of the liquid crystal cell 100 by utilizing the flexibility of the TCP 700. Also, a ¼-wavelength plate 410 and a polarizing plate 510 are arranged on the outer surface of the array substrate 110, and a ¼-wavelength plate 420 and a polarizing plate 520 are arranged on the outer surface of the counter substrate 120 such that the angle formed between the phase-delaying axis of the ¼-wavelength plate 410 and the transmission axis of the polarizing plate 510 is equal to the angle formed between the phase-delaying axis of the ¼-wavelength plate 420 and the transmission axis of the polarizing plate 520.

The array substrate 110 comprises mainly a light transmitting substrate 111 such as a glass substrate, signal lines 112 arranged substantially in parallel with the same distance apart from each other on the substrate 111, scanning lines 114 arranged to extend in a direction substantially perpendicular to the signal lines 112, an interlayer insulation film 113 interposed between the signal lines 112 and the scanning lines 114 so as to electrically insulate the signal lines 112 and the scanning lines 113 from each other, TFT's (thin film transistors) 150 each arranged near the intersections between the signal lines 112 and the scanning lines 114, and pixel electrodes 115a, 115b connected to the TFTs 150. An alignment layer 116 is formed on substantially the entire surface of the array substrate 110 on which are arranged the pixel electrodes 115a and 115b.

Each of the pixel electrodes 115a and 115b included in the array substrate 110 is formed of a conductive light reflecting film including, for example, an aluminum film. The pixel electrodes 115a in the reflecting region 51 can be obtained by patterning a conductive light reflecting film in a predetermined shape. Also, the pixel electrodes 115b in the reflecting-transmitting region 52 can be obtained by forming at least one opening capable of transmitting incident light in the conductive light reflecting film and patterning the conductive light reflecting film in a predetermined shape. For example, each of the pixel electrodes 115a and 115b is sized at 40 μm×120 μm, and 15 circular openings each having a diameter of 4 μm are irregularly arranged in each of the pixel electrodes 115b in the reflecting-transmitting region 52. In general, where the area of the openings is set at about 5% or less based on the area of the pixel, the reduction in the area ratio of the conductive light reflecting film relative to the area of the pixel is negligible.

The counter substrate 120 comprises mainly a light transmitting insulating substrate 121 such as a glass substrate, a light shielding layer 122, a colored layer (color filter layer) 123, a counter electrode 124 and an alignment layer 125. In this embodiment, the counter electrode 124 is commonly used in the reflecting region 51 and the reflecting-transmitting region 52. However, it is possible to divide the counter electrode so as to provide the counter electrode 124 for the region 51 and the counter electrode 124 for the region 52.

Incidentally, an alignment layer treatment is applied to the alignment layer 116 of the array substrate 110 and the alignment layer 125 of the counter substrate 120 so as to permit the liquid crystal molecules in the liquid crystal layer 130 to be aligned in a twisted fashion at a twisting angle of, for example, about 70°. Also, the alignment direction on the side of the display surface of the liquid crystal layer 130 forms an angle of, for example, 45° with the phase-delaying axis 421 of the ¼-wavelength plate 420 (see FIG. 3A).

The array substrate 110 and the counter substrate 120 are made integral by a sealing member (not shown) arranged frame-like between the peripheral portions of these substrates so as to form a hollow cell. A liquid crystal material is poured into the hollow cell so as to form the liquid crystal cell 100. In this embodiment, a nematic liquid crystal is used having a refractive index anisotropy $\Delta n$ of about 0.08 and a relative dielectric constant $\in / \in_0$ of substantially +8.

As described above, in the liquid crystal display 1 according to the first embodiment of the present invention, the display region includes the reflecting region 51 in which display pixels arranged to form a matrix have a construction that the liquid crystal layer 130 is held between the pixel electrode 115a and the counter electrode 124, and the reflecting-transmitting region 52 in which other display pixels arranged to form a matrix have a construction that the liquid crystal layer 130 is held between the pixel electrode 115b and the counter electrode 124. In other words, the display region arranged inside the sealing member in the first embodiment of the present invention comprises the reflecting region 51 provided with display pixels for performing image display by the light reflection mode and the reflecting-transmitting region 52 provided with a plurality of display pixels for performing the image display by the light transmission mode (the light reflection-transmission modes being used in combination in this embodiment).

It is possible for the display pixels in the reflecting region 51 and the reflecting-transmitting region 52 to be formed by the same process and to be of the same layer structure.

The image display method using the liquid crystal display 1 described above will now be described.

Figures 3A, 3B:
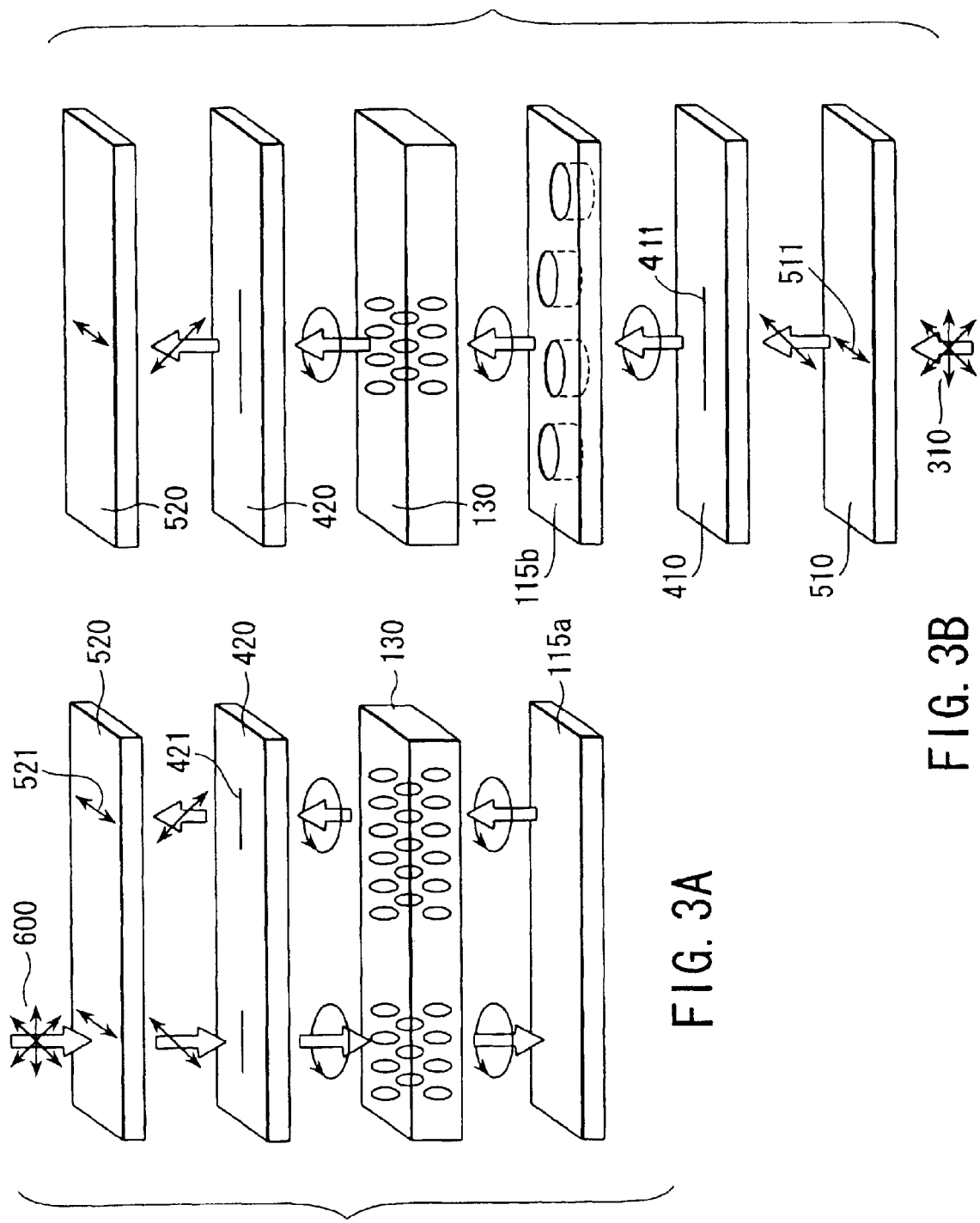
FIGS. 3A and 3B are oblique views each showing schematically the state of the dark display.

FIGS. 3A and 3B are oblique views schematically showing the state of the dark display, and FIGS. 4A and 4B are oblique views schematically showing the state of the bright display. Incidentally, FIGS. 3A and 4A depict a part of the reflecting region 51 so as to show the image display method by the light reflection mode. On the other hand, FIGS. 3B and 4B depict a part of the reflecting-transmitting region so as to show the image display method by the light transmission mode.

As shown in FIGS. 3A and 4A, a normally white display is performed in the reflecting region 51 by the light reflection mode in which the polarizing plate 520, the ¼-wavelength plate 420, the liquid crystal layer 130 and the pixel electrodes 115a are used in combination. On the other hand, it is possible to perform in the reflecting-transmitting region 52 the normally white display by the light reflection mode similar to that in the reflecting region 51. In addition, it is also possible to perform in the reflecting-transmitting region 52 the normally white display by the light transmission mode in which the polarizing plate 520, the ¼-wavelength plate 420, the liquid crystal layer 130, the ¼-wavelength plate 410 and the polarizing plate 510 are used in combination as shown in FIGS. 3B and 4B.

To be more specific, where a voltage equal to or higher than the threshold voltage is applied between the pixel electrodes 115a, 115b and the counter electrode 124, the liquid crystal molecules except the molecules in the vicinity of the electrode surfaces are aligned such that the major axes of the molecules are directed perpendicular to the surfaces of the substrates. As a result, the light incident on the liquid crystal layer 130 is emitted from the liquid crystal layer 130 without giving rise to a change in the polarized state. It follows that external light 600 is changed into linearly polarized light in the reflecting region 51 when the external light 600 passes through the polarizing plate 520, as shown in FIG. 3A and, then, the linearly polarized light is further changed into a circularly polarized light when the linearly polarized light passes through the ¼-wavelength plate 420. Since the polarized state of the circularly polarized light is not changed by the liquid crystal layer 130, the circularly polarized light circulating in the counterclockwise direction, which has arrived at the pixel electrode 115a with light-reflectivity, is reflected by the pixel electrode 115a so as to be changed into circularly polarized light circulating in the opposite direction (clockwise direction). The circularly polarized light circulating in the clockwise direction passes again through the liquid crystal layer 130 and, then, through the ¼-wavelength plate 420 so as to be changed into linearly polarized light having the oscillating direction perpendicular to the transmitting axis 521 of the polarizing plate 520. The linearly polarized light is incapable of being transmitted through the polarizing plate 520. The dark display utilizing the light reflection mode is carried out in this fashion in each of the reflecting region 51 and the reflecting-transmitting region 52.

Also, where a voltage higher than the threshold voltage is applied between the pixel electrode 115b and the counter electrode 124, the light 310 emitted from the planar light source device 300 passes through the polarizing plate 510 on the side of the planar light source so as to be changed into a linearly polarized light, as shown in FIG. 3B and, then, the linearly polarized light passes through the ¼-wavelength plate 410 so as to be changed into circularly polarized light. A part of the circularly polarized light passes through the opening of the pixel electrode 115b so as to pass through the liquid crystal layer 130 without giving rise to a change in the polarization state. The circularly polarized light passing through the liquid crystal layer 130 further passes through the ¼-wavelength plate 420 so as to give rise to an optical-path difference of ¼-wavelength between the two polarized components, with the result that the circularly polarized light is changed into linearly polarized light having the oscillating direction perpendicular to the transmitting axis 521 of the polarizing plate 520. The linearly polarized light is incapable of being transmitted through the polarizing plate 520. The dark display utilizing the light transmission mode is carried out in this fashion in the reflecting-transmitting region 52.

On the other hand, when a voltage is not applied to the liquid crystal layer 130, the liquid crystal molecules in the liquid crystal layer 130 are aligned in a twisted fashion. As a result, the liquid crystal layer 130 exhibits birefringence properties and performs the function equal to that performed by the ¼-wavelength plate. It follows that, in the reflecting region 51, the external light 600 passes through the polarizing plate 520 and the ¼-wavelength plate 420 so as to be changed into circularly polarized light and, then, the circularly polarized light is incident on the liquid crystal layer 130 so as to be emitted from the liquid crystal layer 130 as linearly polarized light, as shown in FIG. 4A. The linearly polarized light emitted from the liquid crystal layer 130 is reflected by the pixel electrodes 115a so as to pass again through the liquid crystal layer 130. In passing through the liquid crystal layer 130, the linearly polarized light is changed again into circularly polarized light. The circularly polarized light further passes through the ¼-wavelength plate 420 so as to be changed into linearly polarized light having the oscillating direction parallel to the transmitting axis 521 of the polarizing plate 520. The linearly polarized light is capable of being transmitted through the polarizing plate 520. In this fashion, the bright display utilizing the light reflection mode is carried out in the reflecting region 51 and the reflecting-transmitting region 52.

Also, when a voltage is not applied to the liquid crystal layer 130, the light 310 emitted from the planar light source device 300 passes through the polarizing plate 510 and the ¼-wavelength plate 410 so as to be changed into circularly polarized light in the reflecting-transmitting region 52, as shown in FIG. 4B. Then, the circularly polarized light is incident on the liquid crystal layer 130 so as to be emitted from the liquid crystal layer 130 as linearly polarized light. The linearly polarized light is changed into circularly polarized light when the linearly polarized light passes through the ¼-wavelength plate 420. A part of the circularly polarized light is incapable of being transmitted through the polarizing plate 520. In this fashion, the bright display utilizing the light transmission mode is carried out in the reflecting-transmitting region 52.

As described above, it is possible to perform the display operation in the light reflecting region and the light transmitting region by the same display mode, i.e., by the normally white mode in this case. It follows that it is possible to permit the polarity of the bright-dark display relative to the signal voltage of the picture signal for the light reflecting region to be equal to that for the light transmitting region.

As described above, the display region is formed of the reflecting region 51 and the reflecting-transmitting region 52 in the first embodiment of the present invention. Therefore, it is possible to utilize the light emitted from the planar light source device 300 in only the reflecting-transmitting region 52 so as to further lower the power consumption.

Incidentally, where the display region is formed of the reflecting region 51 and the reflecting-transmitting region 52, it is difficult in some cases to recognize the image displayed in the reflecting region 51 under a dark environment. However, all the information that can be displayed by the liquid crystal display 1 does not necessarily have a high frequency of use under a dark environment. Therefore, if the information having a high frequency of use under a dark environment is displayed in the reflecting-transmitting region 52 and the information having a low frequency of use under a dark environment is displayed in the reflecting region 51, it is possible to perform image display having high recognizability regardless of the environment of use. In other words, the image display can be performed without causing the user inconvenience regardless of the brightness of the surrounding environment.

Also, in the first embodiment of the present invention, the light emitted from the planar light source device 300 is utilized in the reflecting-transmitting region 52 alone and, thus, it suffices to arrange the planar light source device 300 in only the position corresponding to the reflecting-transmitting region 52. It follows that it is possible to decrease the weight of the liquid crystal display 1 in the first embodiment of the present invention.

Further, since it is possible to arrange the planar light source device 300 in only the position corresponding to the reflecting-transmitting region 52 in the first embodiment of the present invention, it is possible to arrange the control circuit board 200 in the portion, where the planar light source device 300 is not arranged, on the back surface of the liquid crystal cell, i.e., in the portion corresponding to the reflecting region 51. It follows that it is possible to decrease the thickness of the entire apparatus. In addition, it is possible to suppress the cost of the planar light source device 300, compared with the case where the planar light source device 300 is arranged to irradiate the entire surface of the liquid crystal cell.

What should also be noted is that, in the first embodiment of the present invention, the reflecting region 51 and the reflecting-transmitting region 52 are substantially equal to each other in the layer construction except the presence or absence of the planar light source device 300. This makes it possible to realize a liquid crystal display capable of displaying an image by the light reflection mode and the light transmission mode without bringing about an increase in the number of steps of the manufacturing process, an increase in the number of constituting elements, the complexity in the construction of the apparatus, or a decrease in the yield.

In the first embodiment of the present invention, the area ratio of the reflecting region 51 to the reflecting-transmitting region 52 is not particularly limited and can be determined appropriately depending on the use.

In the first embodiment of the present invention, the number of reflecting regions 51 and the number of reflecting-transmitting regions 52 included in the display region are not particularly limited, though it is desirable not to interpose the reflecting region 51 between two adjacent reflecting-transmitting regions 52 in the case where a plurality of regions 52 are included in the display region. In this case, it is possible to use the planar light source device 300 having a smaller area.

Also, in the first embodiment of the present invention, it is desirable for the display pixels included in the reflecting-transmitting region 52 to be arranged in a concentrated fashion without being dispersed within the cell. For example, it is possible to use display pixels of the light reflection mode for forming the entire circumferential region of the liquid crystal cell and to use display pixels of the combination light reflection-light transmission mode for forming the central region of liquid crystal cell. In this case, it is possible to use the planar light source device 300 having a smaller area.

Also, in the first embodiment of the present invention, the pixel electrodes 115a, 115b and the source electrodes of the TFTs 50 are formed separately as shown in FIGS. 1B and 1C. However, it is possible to form these electrodes simultaneously by the same material. It is also possible to form the signal line 112 simultaneously with formation of the electrodes noted above.

In the first embodiment of the present invention, the angle formed between the transmitting axis of the polarizing plate 520 and the phase-delaying axis of the ¼-wavelength plate 420 and the angle formed between the transmitting axis of the polarizing plate 510 and the phase-delaying axis of the ¼-wavelength plate 410 are not particularly limited, as far as the angles noted above are equal to each other. For example, it is possible to arrange the polarizing plates 510, 520 and the ¼-wavelength plates 410, 420 such that the phase-delaying axis 411 of the ¼-wavelength plate 410 forms an angle of 80° with the transmitting axis 511 of the polarizing plate 510, that the phase-delaying axis 411 of the ¼-wavelength plate 420 forms an angle of 80° with the transmitting axis 521 of the polarizing plate 520, and that the transmitting axis 521 of the polarizing plate 520 is parallel to the transmitting axis 511 of the polarizing plate 510. Incidentally, in the first embodiment of the present invention, the liquid crystal display 1 is designed to perform the normally white display. However, it is also possible to design the liquid crystal display 1 to perform the normally black display. Also, in the first embodiment of the present invention, the ¼-wavelength plate 410 and the polarizing plate 510 are arranged on the entire outer surface of the array substrate 110. However, it is also possible not to arrange the ¼-wavelength plate 410 and the polarizing plate 510 in positions corresponding to the reflecting region 51.

Also, in the first embodiment of the present invention, each of the ¼-wavelength plates 410 and 420 is of a single layer structure. However, it is also possible to employ a laminated structure prepared by laminating, for example, a ¼-wavelength plate and a ½-wavelength plate one upon the other. In the case of employing the laminated structure, it is possible to suppress the phenomenon that the refractive index anisotropy of each of the ¼-wavelength plates 410 and 420 is greatly changed depending on the wavelength.

A portable apparatus using the liquid crystal display 1 of the present invention will now be described.

Figure 5:
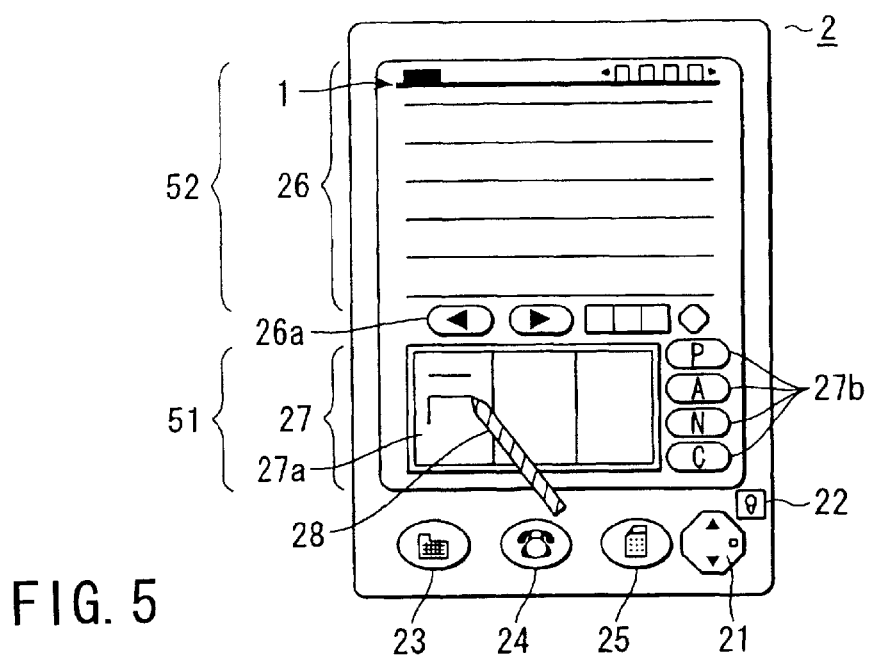
FIG. 5 is a plan view schematically showing as an example the construction of a portable apparatus including a liquid crystal display according to the first embodiment of the present invention.

FIG. 5 is a plan view schematically showing as an example a portable apparatus 2 using the liquid crystal display 1 according to the first embodiment of the present invention. The portable apparatus is required to be capable of displaying images or characters satisfactorily regardless of the environment of use.

The portable apparatus 2 shown in FIG. 5 is a PDA (personal data/digital assistants). The PDA 2 comprises a display section equipped with the liquid crystal display 1, a power source button 21, a backlight button 22 for manually performing the ON/OFF operation of the planar light source device 300, a schedule button 23 for displaying a schedule notebook, an address button 24 for displaying an address notebook, and a memo button 25 for displaying a memo notebook.

The display section of the PDA 2 includes an information display screen 26 and an input operation screen 27. The information display section 26 corresponds to the reflecting-transmitting region 52 of the liquid crystal display 1, and the input operation screen 27 corresponds to the reflecting region 51 of the liquid crystal display 1. The planar light source device 300 is arranged in only the position corresponding to the reflecting-transmitting region 52. Further, the control circuit board 200 for driving the liquid crystal display 1 is arranged in the position corresponding to the reflecting region 51. It follows that the apparatus is rendered thin and lightweight.

As shown in FIG. 5, displayed on the information display screen 26 corresponding to the reflecting-transmitting region 52 are, for example, the schedule notebook, the address notebook, the information stored in the memo notebook, etc. and a page-turning icon 26a, etc. Also, it is possible to supply information with, for example, a pen 28 to the input operation screen 27 corresponding to the reflecting region 51, and the input operation section such as a letter input pad 27a and an Input mode switching button 27b is displayed on the input operation screen 27. In this fashion, the information can be input via the input operation screen 27 in the PDA 2 shown in FIG. 5. Also, since the input operation section is formed of the display screen of the liquid crystal display, it is possible for the user to change the image displayed on the input operation screen 27 so as to change easily the input operation section in accordance with, for example, the input information.

Referring to an example as to how to use the PDA 2, after turning on the power source, the user determines whether to light or extinguish the planar light source device 300. To be more specific, where the environmental brightness is insufficient, the backlight button 22 is operated so as to light the planar light source device 300. It is possible to operate the backlight button 22 not only immediately after turning on the power source but also any time during use of the PDA 2. Also, where the environmental brightness is sufficient, it is possible to operate the backlight button 22 so as to turn off the planar light source device 300. It is also possible for the planar light source device 300 to be interlocked with the operation to turn off the power source button 21 so as to turn off the planar light source device 300.

In general, it is not absolutely necessary to use the light emitted from the planar light source device 300 in order to confirm the displayed contents of the information display screen 26. Therefore, if it is possible to turn on or turn off the planar light source device 300 when the user wishes to as described above, it is possible to save unnecessary power consumption. Also, in general, the frequency of use of the input operation screen 27 for performing, for example, the information input with a pen is lower than that of the information display screen 26 for displaying the information stored in the memory or the received information. Therefore, if it is possible for the information display screen 26 to perform display by the light transmission mode, no inconvenience is generated in many cases even if the input operation screen 27 is incapable of display by the light transmission mode.

To be more specific, in the case of using the PDA 2 under a bright environment, it is possible to recognize satisfactorily the images displayed in both the reflecting region 51 and the reflecting-transmitting region 52 even if the planar light source device 300 is turned off. In this case, power is not consumed by the planar light source device 300.

Also, where it is impossible to recognize satisfactorily the displayed image under the external light alone, it is possible to turn on the planar light source device 300 by depressing the backlight button 22 of the PDA 2. In this case, it is possible to display an image of good recognizability in the reflecting-transmitting region 52 by using both the light reflection mode and the light transmission mode.

Further, under a dark environment as at nighttime, the recognizability of the image displayed by utilizing the light reflection mode alone is rendered markedly low. Therefore, in this case, it is possible to light the planar light source device 300 by operating the backlight button 22 so as to improve the recognizability of the image displayed on the information display screen 26.

As described above, the PDA 2 shown in FIG. 5 permits displaying images or characters on the information display screen 26 in a manner to prevent the user being inconvenienced regardless of the environmental brightness. The PDA 2 also permits saving power consumption.

Figure 6:
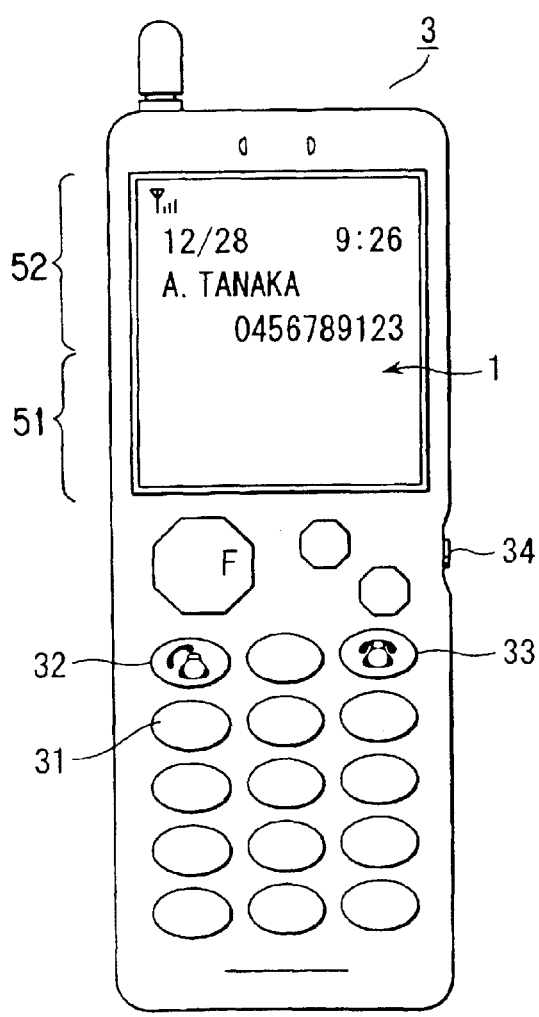
FIG. 6 is a plan view schematically showing as another example the construction of a portable apparatus including a liquid crystal display according to the first embodiment of the present invention.

FIG. 6 is a plan view showing another example of a portable apparatus 3 using the liquid crystal display according to the first embodiment of the present invention. The portable apparatus 3 shown in FIG. 6 is a portable telephone. It is desirable for the portable telephone 3 to be capable of confirming the name and the telephone number of the other party when receiving or making a telephone call in order to prevent, for example, an erroneous telephone communication. Also, the portable telephone 3 is used as a watch by some users and, thus, it is desirable for the portable telephone 3 to be capable of confirming the time regardless of the environmental brightness.

The portable telephone 3 shown in FIG. 6 comprises a display section equipped with a liquid crystal display 1, telephone number buttons 31, a communication button 32, an end button 33, and a backlight button 34 for manually controlling the turning on and the turning off of the planar light source device 300. In this embodiment, the backlight button 34 is mounted to the side surface of the portable telephone 3 so as to permit the button 34 to be easily found by finger movement.

The liquid crystal display 1 included in the portable telephone 3 comprises the reflecting-transmitting region 52 for displaying, for example, the time and telephone call information such as the name, telephone number and the e-mail address, and the reflecting region 51 for displaying the telephonic communication time, the charge for the telephone call, the contents of an e-mail, etc. What should be noted is that at least the information the user wishes to recognize regardless of the environmental brightness is displayed in the reflecting-transmitting region 52 so as to make it possible to permit the required displayed image to be recognized even if there is a limitation in the environment of use.

Referring to an example as to how to use the portable telephone 3, the reflecting-light transmitting region 52 included in the portable telephone 3 is allowed to perform display by the light reflection-light transmission mode, and the reflecting region 51 is allowed to perform display by the light reflection mode, if the planar light source device 300 is lit by the user's judgment after turning on the power source.

Also, if the planar light source device 300 is turned off by manually operating the backlight button 34 by the user's judgment at an optional time, the display by the light reflection mode alone can be performed in the reflecting-transmitting region 52.

It is effective to turn off the planar light source device 300 by operating the backlight button 34 when, for example, the environmental brightness is sufficiently high to perform a satisfactory display under external light alone. In this case, it is possible to use the portable telephone 3 with the minimum required power consumption so as to make it possible to use the portable telephone 3 for a longer time with a battery of a predetermined capacity.

Also, if user wishes to confirm the information such as the name and telephone number of the person who has made the telephone call on receiving the telephone call in the case where the environment is dark so as to make it difficult to recognize images or characters displayed by the light reflection mode, it is possible to recognize the image displayed by the light transmission mode by operating the backlight button 34 so as to turn on the planar light source device 300 serving to irradiate the reflecting-transmitting region 52. Where it is unnecessary to confirm the display section during, for example, telephone conversation after confirmation of the displayed contents, it is possible to continue the telephone conversation by turning off the planar light source device 300.

As described above, in the portable equipment of the present invention, only the portion where the confirmation of display is desirable even under a dark environment is displayed by the combination light reflection-light transmission mode, with the result that it suffices to arrange the planar light source device 300 in a position effective for irradiating the reflecting-transmitting region alone so as to decrease the weight of the apparatus, compared with the case where the planar light source device 300 is arranged to irradiate the entire display region.

Also, it is possible to arrange the control circuit board, etc., in the portion, where the planar light source device is not arranged, on the back surface of the liquid crystal cell, so as to decrease the thickness of the entire apparatus.

What should also be noted is that it is possible to turn on or turn off the planar light source device 300 by the judgment of the user so as to suppress unnecessary power consumption.

As described above, it is possible to realize miniaturization and a decrease in weight, thickness and power consumption of the portable terminal by using a display capable of allowing confirmation of the displayed image, which is desired to be recognized, without being limited by the environment of use and also capable of achieving low power consumption.

Each of the embodiments described above is directed to a liquid crystal display comprising a reflecting region for performing display by the light reflection mode and a reflecting-transmitting region for performing display by the combination light reflection-transmission mode. However, it is also possible to apply the technical idea of the present invention to the overall liquid crystal display for performing display by the light reflection mode and the light transmission mode.

Figure 7A:
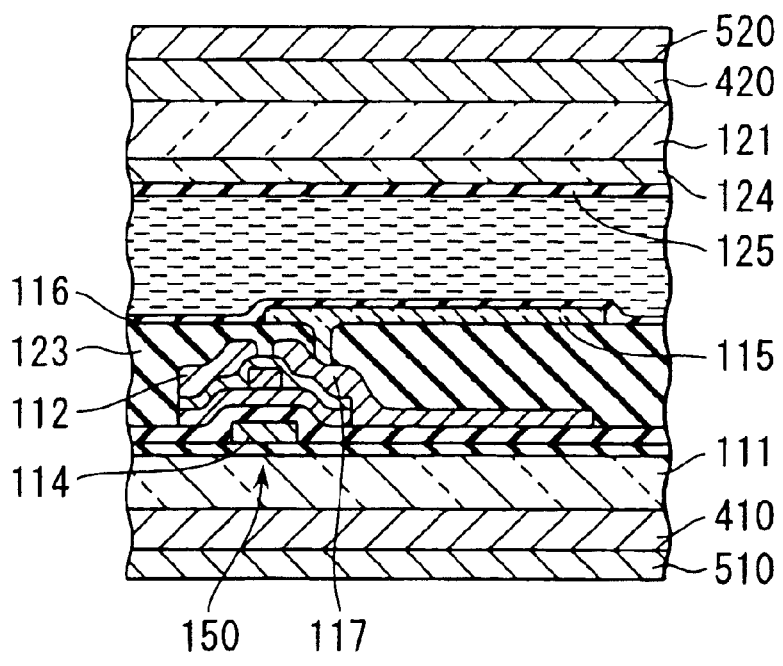
FIG. 7A is a cross-sectional view schematically showing the construction of a part of the reflection region included in a liquid crystal display according to a second embodiment of the present invention.
Figure 7B:
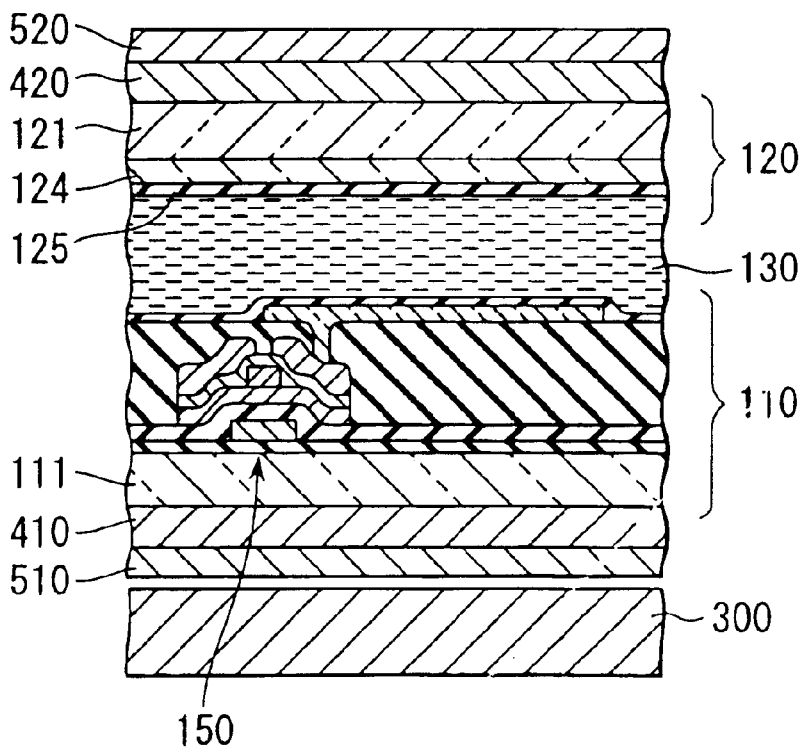
FIG. 7B is a cross-sectional view schematically showing the construction of a part of the light transmitting region included in a liquid crystal display according to the second embodiment of the present invention.

FIG. 7A is a cross-sectional view schematically showing the construction of a part of the reflecting region included in a liquid crystal display according to a second embodiment of the present invention, and FIG. 7B is a cross-sectional view schematically showing the construction of a part of the transmitting region included in the liquid crystal display according to the second embodiment of the present invention. The liquid crystal display according to the second embodiment of the present invention is substantially equal to the liquid crystal display according to the first embodiment, except that the display region included in the liquid crystal display according to the second embodiment of the present invention comprises a reflecting region for performing display by the light reflection mode and a transmitting region for performing display by the light transmission mode. In other words, the second embodiment is substantially equal to the first embodiment, except that the transmitting region is used in the second embodiment in place of the reflecting-transmitting region included in the first embodiment.

In the reflecting region included in the liquid crystal display according to the second embodiment of the present invention, a drain electrode 117 made of a metal equal to that of the signal line 112 is formed to extend into a region below the pixel electrode 115 made of a transparent conductive material such as ITO as shown in FIG. 7A so as to allow the drain electrode 117 to perform the function of a light reflecting plate. On the other hand, in the transmitting region of the liquid crystal display, the drain electrode 117 is not formed to extend into a region below the pixel electrode 115 so as to permit the light emitted from the planar light source device 300 to be incident on the liquid crystal layer 130. The liquid crystal display of the particular construction also permits producing effects substantially equal to those described previously in conjunction with the first embodiment of the present invention. Incidentally, it is possible for the liquid crystal display according to the second embodiment of the present invention to further comprise a front light.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display, comprising:

first and second substrates facing each other;

first pixel electrodes arrayed on at least one continuous first area within a surface of the first substrate facing the second substrate;

second pixel electrodes arrayed on at least one continuous second area within the surface of the first substrate facing the second substrate, the second area being spaced apart from the first area;

a first common electrode supported by the second substrate and facing first pixel electrodes;

a second common electrode supported by the second substrate and facing the second pixel electrodes; and a liquid crystal layer interposed between the first pixel electrodes and the first common electrode and between the second pixel electrodes and the second common electrode, wherein a first display region corresponding to the first area displays an image by light reflection mode, and a second display region corresponding to the second area can display an image by light transmission mode.

2. A liquid crystal display according to claim 1, wherein the second display region can display an image by light transmission mode and can display an image by light reflection mode.

3. A liquid crystal display according to claim 1, wherein each of the first pixel electrodes is formed of a light reflecting conductive film, and each of the second pixel electrodes is formed of a light reflecting conductive film provided with at least one opening.

4. A liquid crystal display according to claim 3, wherein a material of the first pixel electrodes is the same as a material of the second pixel electrodes, and a material of the first common electrode is the same as a material of the second common electrode.

5. A liquid crystal display according to claim 1, wherein each of the first pixel electrodes and the second pixel electrodes is formed of a transparent conductive film, and a reflecting layer is arranged between each of the first pixel electrode and the first substrate.

6. A liquid crystal display according to claim 1, wherein the first common electrode is electrically connected to the second common electrode.

7. A liquid crystal display according to claim 1, further comprising a planar light source device configured to emit light from a side of the first substrate opposite to a side of the first substrate facing the second substrate toward the liquid crystal layer.

8. A liquid crystal display according to claim 7, wherein the planar light source device is configured to irradiate selectively the second display region among the first and second display regions with the light.

9. A liquid crystal display according to claim 1, wherein the second area is larger than the first area.

10. A liquid crystal display according to claim 1, wherein the first and second areas constitute a third area, and wherein the first area is disposed between the second area and a side of the third area and extends along the side of the third area.

11. A liquid crystal display, comprising:

first and second substrates facing each other;

first pixel electrodes arrayed on a first area within a surface of the first substrate facing the second substrate;

second pixel electrodes arrayed on a second area within the surface of the first substrate facing the second substrate, the second area being different from the first area;

a first common electrode supported by the second substrate and facing the first pixel electrodes;

a second common electrode supported by the second substrate and facing the second pixel electrodes; and a liquid crystal layer interposed between the first pixel electrodes and the first common electrode and between the second pixel electrodes and the second common electrode, wherein each of the first pixel electrodes is formed of a reflecting conductive film, and each of the second pixel electrodes is formed of a reflecting conductive film provided with at least one opening.

12. A liquid crystal display according to claim 11, wherein a material of the first pixel electrodes is the same as a material of the second pixel electrodes, and a material of the first common electrode is the same as a material of the second common electrode.

13. A liquid crystal display according to claim 11, wherein the first common electrode is electrically connected to the second common electrode.

14. A liquid crystal display according to claim 11, further comprising a planar light source device configured to emit light from a side of the first substrate opposite to a side of the first substrate facing the second substrate toward the liquid crystal layer.

15. A liquid crystal display according to claim 14, wherein the planar light source device is configured to irradiate selectively the second display region among the first and second display regions with the light.

16. A liquid crystal display according to claim 11, wherein the second area is larger than the first area.

17. A liquid crystal display according to claim 11, wherein the first and second areas constitute a third area, and wherein the first area is disposed between the second area and a side of the third area and extends along the side of the third area.

18. A liquid crystal display, comprising:

first and second substrates facing each other;

first pixel electrodes arrayed on at least one continuous first area within a surface of the first substrate facing the second substrate;

a reflecting film interposed between the first pixel electrodes and the first substrate;

second pixel electrodes arrayed on at least one continuous second area within the surface of the first substrate facing the second substrate, the second area being spaced apart from the first area;

a first common electrode supported by the second substrate and facing the first pixel electrodes;

a second common electrode supported by the second substrate and facing the second pixel electrodes; and a liquid crystal layer interposed between the first pixel electrodes and the first common electrode and between the second pixel electrodes and the second common electrode, wherein each of the first pixel electrodes and the second pixel electrodes is formed of a transparent conductive film.

19. A liquid crystal display according to claim 18, wherein a material of the first pixel electrodes is the same as a material of the second pixel electrodes, and a material of the first common electrode is the same as a material of the second common electrode.

20. A liquid crystal display according to claim 18, wherein the first common electrode is electrically connected to the second common electrode.

21. A liquid crystal display according to claim 18, further comprising a planar light source device configured to emit light from a side of the first substrate opposite to a side of the first substrate facing the second substrate toward the liquid crystal layer.

22. A liquid crystal display according to claim 21, wherein the planar light source device is configured to irradiate selectively the second display region among the first and second display regions with the light.

23. A liquid crystal display according to claim 18, wherein the second area is larger than the first area.

24. A liquid crystal display according to claim 18, wherein the first and second areas constitute a third area, and wherein the first area is disposed between the second area and a side of the third area and extends along the side of the third area.

* * * * *